(12) United States Patent
Jung

(10) Patent No.: US 7,047,341 B2
(45) Date of Patent: May 16, 2006

(54) MULTI-PROCESSING MEMORY DUPLICATION SYSTEM

(75) Inventor: Sang Ik Jung, Suwon-si (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 10/322,715

(22) Filed: Dec. 19, 2002

(65) Prior Publication Data

US 2003/0126348 A1    Jul. 3, 2003

(30) Foreign Application Priority Data

Dec. 29, 2001    (KR)    ............................ 2001-88167

(51) Int. Cl.
*G06F 13/14*    (2006.01)
(52) U.S. Cl. ...................... 710/305; 710/314; 711/141; 714/1
(58) Field of Classification Search ................ 710/305, 710/300, 314; 711/141; 714/1
See application file for complete search history.

(56) References Cited

U.S. PATENT DOCUMENTS

| | | | | |
|---|---|---|---|---|
| 3,889,237 A | * | 6/1975 | Alferness et al. | 711/148 |
| 4,654,819 A | * | 3/1987 | Stiffler et al. | 711/162 |
| 4,905,145 A | * | 2/1990 | Sauber | 712/28 |
| 4,941,087 A | * | 7/1990 | Kap | 710/260 |
| 5,157,663 A | * | 10/1992 | Major et al. | 714/10 |
| 5,214,652 A | * | 5/1993 | Sutton | 714/10 |
| 5,235,700 A | * | 8/1993 | Alaiwan et al. | 714/13 |
| 5,278,975 A | * | 1/1994 | Ishihata et al. | 713/375 |
| 5,325,503 A | * | 6/1994 | Stevens et al. | 711/146 |
| 5,394,555 A | * | 2/1995 | Hunter et al. | 711/148 |
| 5,473,599 A | * | 12/1995 | Li et al. | 370/219 |
| 5,488,716 A | * | 1/1996 | Schneider et al. | 714/10 |
| 5,551,050 A | * | 8/1996 | Ehlig et al. | 714/11 |
| 5,577,204 A | * | 11/1996 | Brewer et al. | 710/317 |
| 5,737,514 A | * | 4/1998 | Stiffler | 714/13 |
| 5,887,146 A | * | 3/1999 | Baxter et al. | 710/104 |
| 5,887,270 A | * | 3/1999 | Brant et al. | 711/162 |
| 5,907,673 A | * | 5/1999 | Hirayama et al. | 714/16 |
| 5,958,070 A | * | 9/1999 | Stiffler | 714/13 |
| 5,987,621 A | * | 11/1999 | Duso et al. | 714/4 |
| 6,223,304 B1 | * | 4/2001 | Kling et al. | 714/12 |
| 6,389,496 B1 | * | 5/2002 | Matsuda | 710/316 |
| 6,516,442 B1 | * | 2/2003 | Wang et al. | 714/776 |
| 6,578,095 B1 | * | 6/2003 | Tanaka et al. | 710/100 |
| 6,631,474 B1 | * | 10/2003 | Cai et al. | 713/300 |

(Continued)

OTHER PUBLICATIONS

PCIMG, "CompactPCI", PCIMG, http://ww.picmg.org/test/compci.htm.*

(Continued)

*Primary Examiner*—Rehana Perveen
*Assistant Examiner*—Justin I. King
(74) *Attorney, Agent, or Firm*—Fleshner & Kim, LLP

(57) ABSTRACT

Embodiments of the present invention relate to an apparatus including a first processor module, a second processor module, and a bus. The bus is coupled to the first processor module and the second processor module. The bus is configured to transmit both processor related communication and memory related communication. In embodiments, the first processor module includes a first central processing unit and the second processing module includes a second central processing unit. Accordingly, in embodiments of the present invention, a single bus can be used to communicate between processors and memories. The present invention is useful for real time duplication of memory, high speed duplication of memory, and/or a coherency check of memory between a first processing module and a second processing module.

15 Claims, 8 Drawing Sheets

U.S. PATENT DOCUMENTS

| | | | |
|---|---|---|---|
| 6,647,508 B1* | 11/2003 | Zalewski et al. | 714/3 |
| 6,742,072 B1* | 5/2004 | Prakash et al. | 710/305 |
| 6,772,298 B1* | 8/2004 | Khare et al. | 711/144 |
| 6,823,429 B1* | 11/2004 | Olnowich | 711/141 |
| 2002/0145609 A1* | 10/2002 | Emmot et al. | 345/502 |

OTHER PUBLICATIONS

PCIMG, "CompactPCI Short Form Specification", 1995, PCIMG.*

IEEE, "IEEE Standard for Scalable Coherent Interface (SCI)", 1992, IEEE, pp. iii-vi.*

Jon Crowcroft, "Open Distributed Systems", 1996, University Colledge London, http://www.cs.ucl.ac.uk/staff/jon/ods.*

Jan Lindstrom, "HIgh Availability and Fault-Tolerance in Real-Time Databases", 2001, The Computer Science Department at the University of Helsinki, http://www.cs.helsinki.fi/u/kraatika/courses/sem01a/lindstrom.pdf.*

PCI Special Interest Group, "PCI-to-PCI Bridge Architecture Specification", 1998, PCI Special Interest Group, Rev. 1.1, pp. 11-13 and 19-30.*

* cited by examiner

US 7,047,341 B2

MULTI-PROCESSING MEMORY DUPLICATION SYSTEM

BACKGROUND OF THE INVENTION

1. Field of the Invention

The present invention generally relates to a bus that is configured to transmit both processor related communication and memory related communication between two processor modules.

2. Background of the Related Art

Some computer systems have more than one central processing unit. A central processing unit is a brain of a computer. Accordingly, some computer systems have more than one brain. Each central processing unit may also have other supporting hardware, such as memory (i.e., DRAM). In such computer systems, it is necessary for the at least two processors and the at least two memories to communicate with each other.

Unfortunately, problems do exist in this communication between a plurality of processors and a plurality of memories. One problem is that the cost is prohibitive to include separate mechanisms for communicating between memories and communicating between processors. Also, there are problems with errors in the communication between the two processors or the two memories. Additionally, the communication between processors or memories may be too time consuming and therefore slow down the entire computer system.

SUMMARY OF THE INVENTION

The object of the present invention is to at least overcome the disadvantages discussed above. Embodiments of the present invention relate to an apparatus including a first processor module, a second processor module, and a bus. The bus is coupled to the first processor module and the second processor module. The bus is configured to transmit both processor related communication and memory related communication. In embodiments, the first processor module includes a first central processing unit and the second processor module includes a second central processing unit. Accordingly, in embodiments of the present invention, a single bus can be used to communicate between processors and memories. This is advantageous for several reasons. First, if a computer system only needs one bus to communicate between memories and processors, costs of the computer system can be reduced. Second, due to the use of a single bus for processor related communication and memory related communication, a Mean Time Between Failures (MTBF) can be minimized. In other words, the speed of a computer system can be increased, which is always desirable to users.

The present invention is useful for real time duplication of memory, high speed duplication of memory, and/or a coherency check of memory between a first processor module and a second processor module. Any of these functions improve the reliability and performance of a computer system. Accordingly, a computer system utilizing embodiments of the present invention will benefit a user by the cost of the computer system, the reliability of the computer system, and effectiveness of the computer system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

In general, a scalable multi-processing structure may use a PCI bus. A scalable multi-processing system may include two processor modules having the same construction. Each processor module may have additional hardware for performing communication between the two processors. Further, each processor module may include a central processing unit and/or a basic memory system. A duplication channel may be used to duplicate memory and a PCI bus may be used for scalability.

Figure 1:
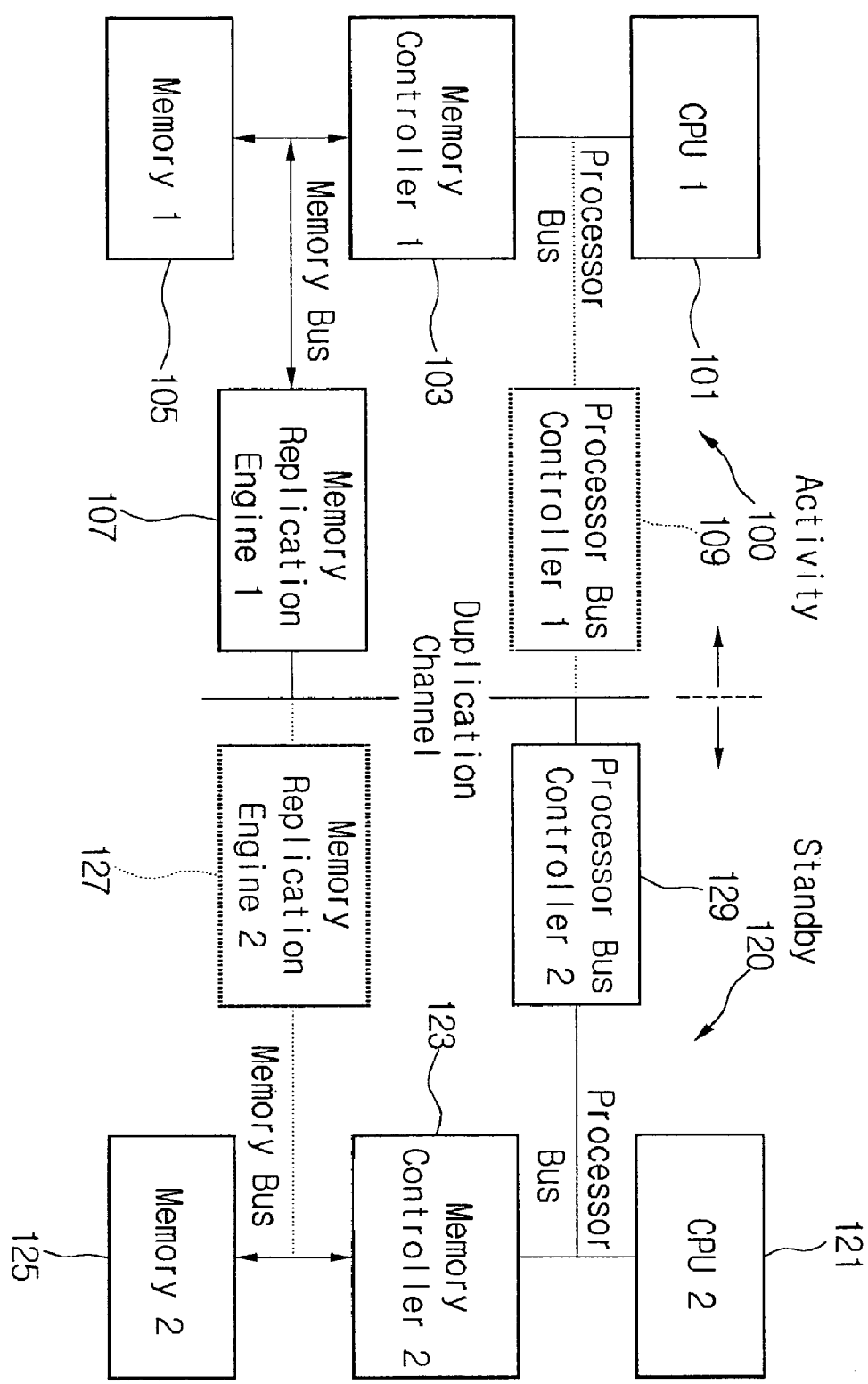
FIG. 1 is a schematic diagram illustrating an exemplary memory duplication system.

FIG. 1 illustrates an exemplary embodiment of a memory duplication system that includes a first module 100 for operating an active processor and a second module 120 for operating a non-active processor. These two modules may have the same structure. First and second modules 100 and 120 may include first and second central processing units 101 and 121; first and second memory controllers 103 and 123; first and second memories 105 and 125; first and second memory duplication engines 107 and 127; and/or first and second processor bus controllers 109 and 129. The first and second central processing units 101 and 121 may be respectively connected to the memory controllers 103 and 123 and the processor bus controllers 109 and 129 via the processor bus to process data for general purposes. The first and second memory controllers 103 and 123 may be respectively connected to the memories 105 and 125 in the memory bus to control the read/write operation of data.

The first and second memory duplicating engines 107 and 127 may have a memory bus interface unit to interface with the memory bus and a duplication channel interface to interface with the processor bus controllers 109 and 129. The processor bus controller 129 of non-active processor module 120 may have a duplication channel interface to connect to memory duplication engine 107. The processor bus controller 129 may have a processor bus interface to interface with the memory controller 123.

The first memory duplication engine 107 of the active processor module 100 may monitor the memory bus and may transmit duplication data into the second processor bus controller 129 of the non-active processor module 120. The first memory duplication engine 107 and the second processor bus controller 129 may be connected with the duplication channel. The second processor bus controller 129 may receive the duplication data transmitted through the duplication channel and transmit the duplication data to the second memory controller 123. The duplication data may then be recorded at second memory 125.

Data may be recorded at the first memory 105 by the first memory controller 103 of the active processor module 100, the operation of the memory duplication enables the memory duplication. The first memory duplication engine 107 may first bring data to be duplicated through the memory bus. The engine 107 may then transmit the duplication data to the second processor bus controller 129 of the non-active processor module 120. The data may then be recorded in the second memory 125 through bus controller 129 and the second memory controller 123 of the non-active processor module 120.

Figure 2:
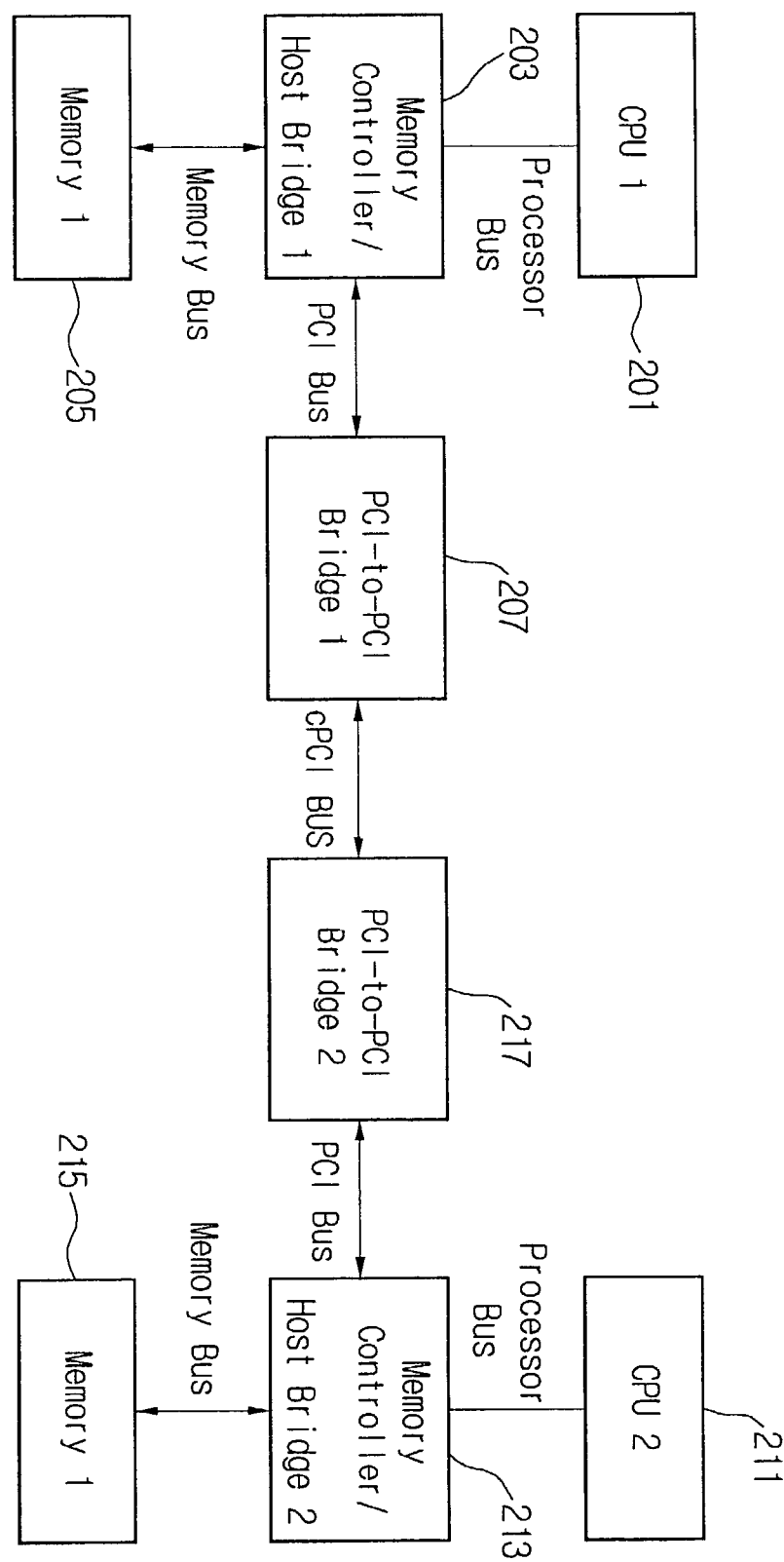
FIG. 2 is a block diagram illustrating an exemplary scalable multi-processing system.

FIG. 2 is an exemplary illustration of a scalable multi-processing system. The system may include a peripheral components interconnect bus and two processor modules which operate separately and independently. Each processor module may have first and second central processing units 201 and 211, first and second memory controllers/host bridges 203 and 213, first and second memory 205 and 215, and/or first and second PCI-to-PCI bridges 207 and 217.

Data is transmitted between the two processor modules through a link for the communication between the two processors. To transmit data, the PCI-to-PCI bridges 207 and 217 should have a non-transparent feature. In other words, an address conversion should occur freely in both a local PCI bus-to-compact PCI bus data transmission and a compact PCI bus-to-local PCI bus data transmission. The PCI-to-PCI bridges 207 and 217 may be used to process any interrupt between the two processors with a message unit.

A first central processing unit 201 may determine which data is to be transmitted to the other processor. The processor prepares the data in a specified region in the memory systems 203 and 205 and initializes a direct memory access engine of the first host bridge 203. Data is then read from the first memory 205 and transmitted to memory systems 213 and 215. The read data may pass through the first PCI-to-PCI bridge 207, the second PCI-to-PCI bridge 217, and the send memory controller/host bridge 213. The addresses of the first memory 205 may be converted if necessary. The first central processing unit 201 may then inform the second central processing unit 211 of the other processor module of completion of the data transmission, the process informing, to the second central processing unit 211, that the data transmission has been completed. This may be accomplished by performing an interrupt process by means of the message unit of the second PCI-to-PCI bridge 207.

However, the scalable multi-processing system illustrated in FIGS. 1 and 2 does not have capability of performing memory duplication. Accordingly, the embodiments illustrated in FIGS. 1 and 2 may have a relatively large Mean Time Between Failure (MTBF). To improve or decrease the MTBF, embodiments of the present invention utilize the same bus for processor related data and memory related data.

Figure 3:
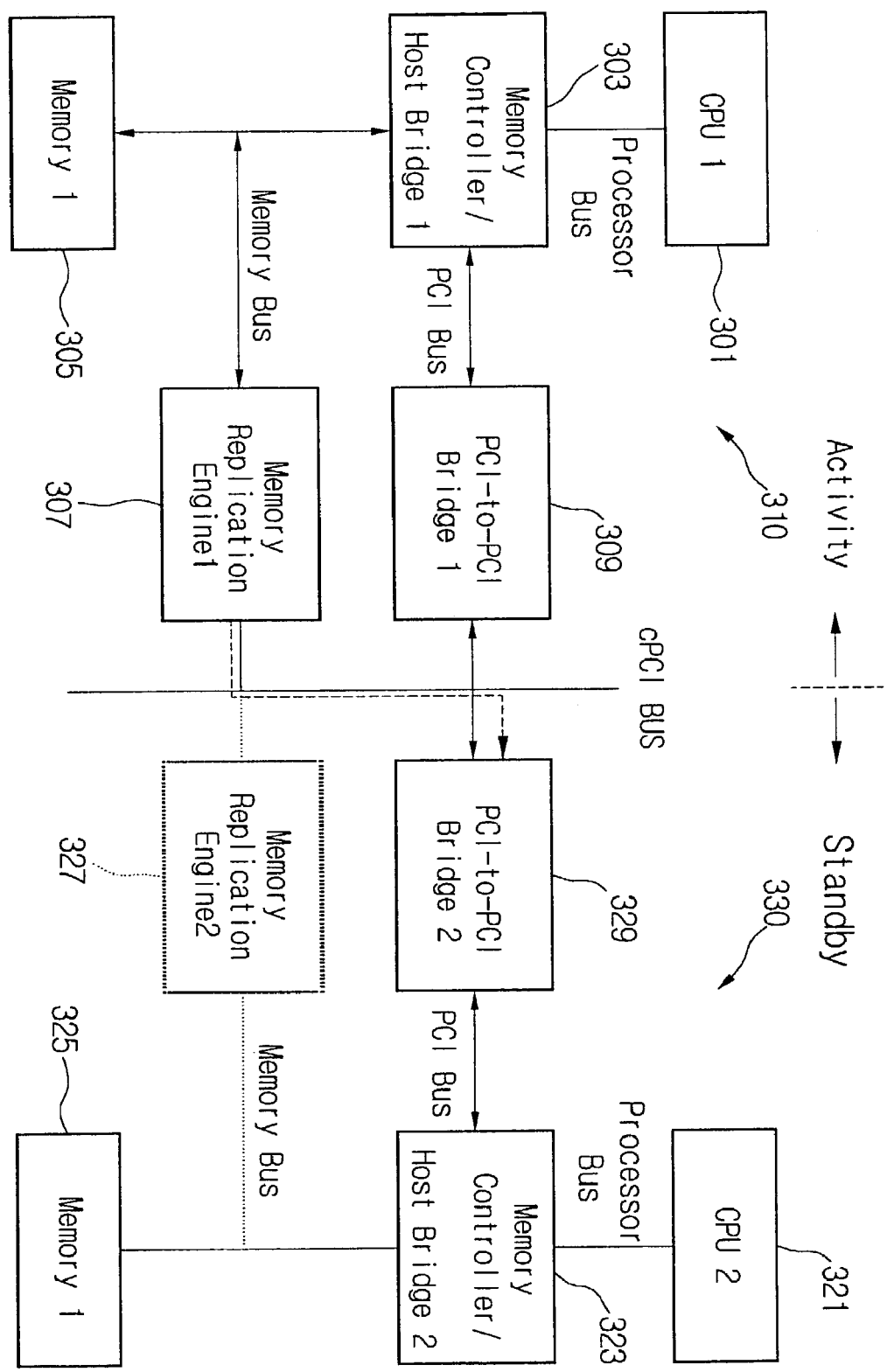
FIG. 3 is a schematic diagram illustrating an exemplary memory duplication system using a peripheral components interconnect bus.

An exemplary embodiment of a memory duplication system using a peripheral components interconnect bus is illustrated in FIG. 3. Active and non-active processor modules 310 and 330 include first and second central processing units (CPU) 301 and 321, first and second memory controllers/host bridges 303 and 323, and first and second memories 305 and 325. Communication between the processor modules is performed using first and second PCI-to-PCI bridges 309 and 329. Memory duplication operations are performed by first and second memory duplication engines 307 and 327. Each central processing unit 301 and 321 performs a variety of control and data processing. First and second memory controllers/host bridges 303 and 323 communicate with the central processing units 301 and 321 through a processor bus. First and second memory controllers/host bridges 303 and 323 communicate with the first and second memories 305 and 325 through a memory bus.

The first and second memory controllers/host bridges 303 and 323 interface with the PCI-to-PCI bridges 309 and 329 through a PCI bus on each respective side. The two PCI-to-PCI bridges 309 and 329 may be connected with each other through a compact PCI bus (cPCI bus) for mutual communication between the processors and having an scalable construction. The host bridge may include a direct memory access (DMA) engine for transmitting pure data, regardless of CPU operation. In embodiments, the DMA engine can be installed on the PCI-to-PCI bridge or on an external side.

First memory duplication engine 307 may perform memory duplication by transmitting the data of the memory bus to be duplicated to the other PCI-to-PCI bridge 329. Active processor module 310 may operate in a real time duplication mode, a high speed duplication mode, and/or a coherency checking mode in order to duplicate the data stored in the first memory 305 to the second memory 325 of the non-active processor module 310.

In embodiments, real time duplication mode is a memory duplication function in which first memory duplication engine 307 of active processor module 310 monitors a memory bus. In embodiments, high speed duplication mode reads data in a specific region of the first memory and transmits the data to a second memory of processor module 320. In embodiments, coherency checking mode confirms that original memory contents are identical to that of the image data. The image data in the specific region of the first memory 305 is compared to data in second memory 325.

I) Real Time Duplication Mode

First CPU 301 of the active processor module 310 controls the first memory controller/host bridge 303. The first memory controller/host bridge 303 controls the data to be stored in the first memory 305 through the memory bus. The first memory duplication engine 307 interfaces with the memory bus connected between the first memory controller/host bridge 303 and the first memory 305. The first memory duplication engine 307 monitors the data stored in the first memory 305 in real time. First memory duplication engine 307 duplicates the data and the data's relevant address. First memory duplication engine 307 transmits the duplicated data to the second PCI-to-PCI bridge 329 of the other processor module 330. The second PCI-to-PCI bridge 329 duplicates the data in the corresponding region of the second memory 325 through the second memory controller/host bridge 323.

Figure 4:
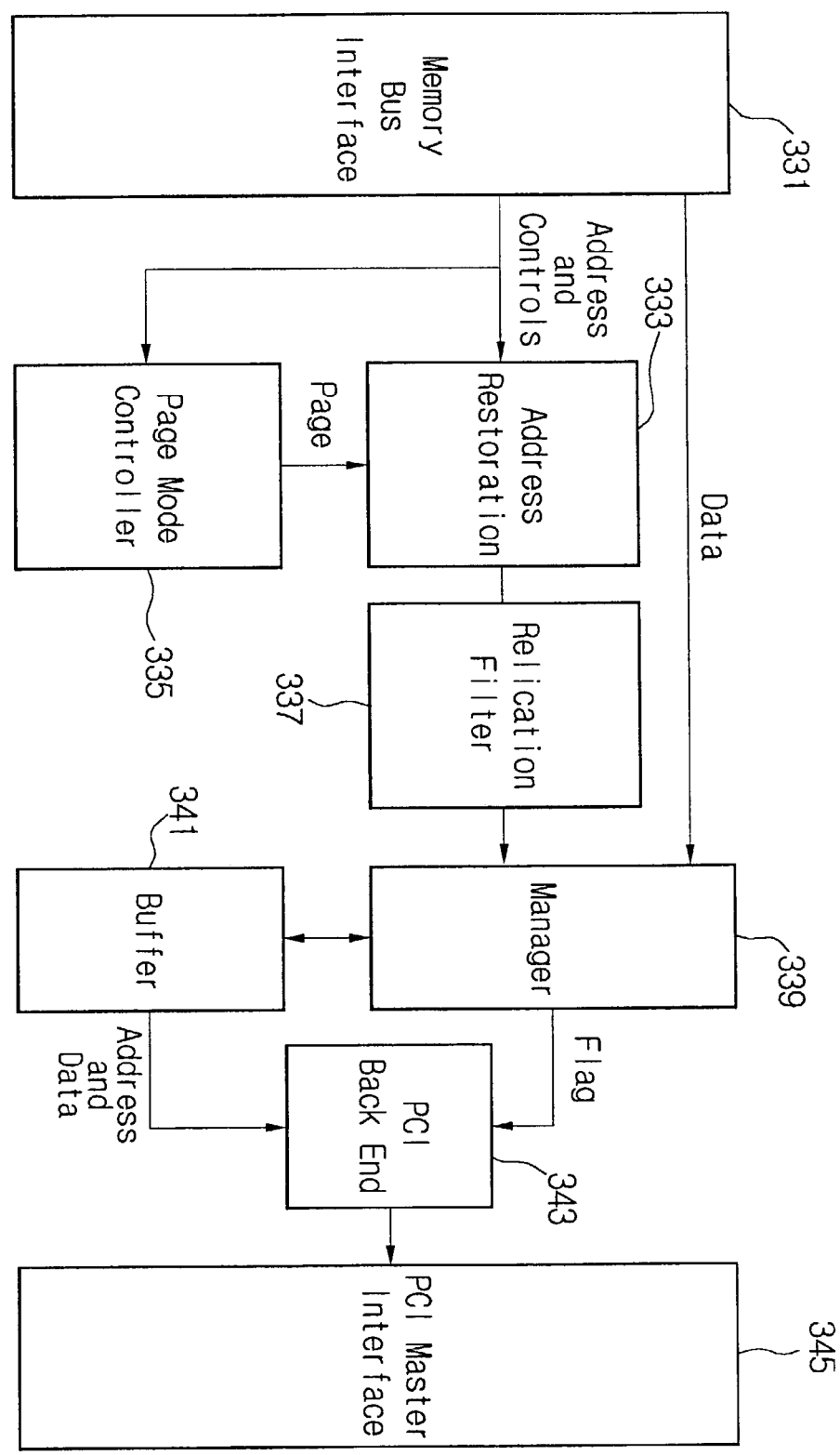
FIG. 4 is a detailed schematic diagram illustrating an exemplary memory duplication engine.

As shown in exemplary embodiments illustrated in FIG. 4, the memory duplication engine 307 may include a memory bus interface unit 331, an address restoration 333, a page mode controller 335, a replication filter 337, a buffer manager 339, a buffer 341, a PCT back end 343, and/or a PCI master interface 345. The memory bus interface unit 331 interfaces with the memory bus of the first memory 305 to monitor the memory bus. When the memory system (memory controller and memory) identifies whether the page mode operates and/or when the page mode operates, the page mode controller 335 manages present open pages in connection with the memory system and transmits the page information to the address restoration 333. The address restoration 333 performs a role of restoring the actual address by analyzing an address of the presently recorded data and control signals. The replication filter 337 detects the restored address and determines whether or not corresponding data is to be duplicated.

The buffer manager 339 stores the data to be duplicated and relevant address in the buffer 341, manages current status of the buffer 341, and transmits the status management/information flag to the PCI back end 343. The buffer 341 may temporarily store the duplicated data before transmitting the data to processor module 330. The status information flag indicates whether the duplicated data is stored in the buffer 341.

The PCI back end 343 may read the data temporarily stored in the buffer 341 and the relevant address according to the current status of the buffer 341. The PCI back end 343 performs the address conversion and then transmits the data through the PCI master interface unit 345. The address conversion changes the address to an address compliant with second PCI-to-PCI bridge 329 to transmit to processor module 330. The PCI master interface unit 345 may operate as a PCI for duplicating data memory systems 323, 325 through second PCI-to-PCI bridge 329. The duplicated data from the first memory duplication engine 307 may be transmitted to second memory controller/host bridge 323 through second PCI-to-PCI bridge 329 of the non-active processor module 330. Real time duplicated data is recorded in the second memory 325. In a similar manner, the memory duplication engine 307 may monitor the changeable data of the active processor module, duplicate the data to be duplicated, and then transmit the duplicated data to second PCI-to-PCI bridge 329 of processor module 320 to perform the real time memory duplication. Memory duplication mode may be continuously performed in real time while memory duplication is active.

II) High Speed Duplication Mode

First CPU 301 of the active processor module 310 may initialize a DMA engine of first host bridge 303 for duplication of the memory data in a predetermined region of first memory 305. The initializing operation sets a start address of the first memory 305, a size from the start address, and a destination address corresponding to a path for the duplicated data. The DMA engine of the first host bridge 303 may read the predetermined region of the first memory 305 using start address and size, and convert the address to the destination address.

A DMA engine of the first host bridge 303 may transmit the data of the predetermined region read from the first memory 305 to the first PCI-to-PCI bridge 309. The first PCI-to-PCI bridge 309 may transmit the data to the second PCI-to-PCI bridge 329 of the non-active processor module 330. Accordingly, the second PCI-to-PCI bridge 329 may duplicate data of the predetermined region from the first memory 309 to a corresponding region of the second memory 325 through the second memory controller/host bridge 323. The memory duplication may be done in specific block units. It is possible to duplicate a great volume of already stored data through the high speed memory duplication operation.

III) Memory Coherency Checking Mode

DMA engine of first host bridge 303 of active processor module 310 may make an image of a part of a region in second memory 315 of non-active processor module 330 in the first memory 305. In other words, the image is built in the specific region of first memory 305.

The DMA engine of the first host bridge 303 may require identity proving data with the DMA engine of the second host bridge 323 through the first and second PCI-to-PCI bridges 309, 329. DMA engine of the second host bridge 323 reads the specific region of the second memory 325, corresponding to the required data, and transmits it to the DMA engine of the first host bridge 303 through the second PCI-to-PCI bridge 329 and the first PCI-to-PCI bridge 309. The DMA engine of the first host bridge 303 may replicate specific region data as read in the image of the first memory 305. The DMA engine of the first host bridge 303 may confirm the checking between the replicated data in the image region and the original memory region. The DMA engine of the first host bridge 303 may detect if data is accurately duplicated.

The above-mentioned identity proving mode may be performed when it is necessary to detect whether the duplicated data in the second memory 315 is identical with the original memory region of the first memory 305, before the active processor module 310 is switched to the non-active processor module 320.

Memory coherency checking may be for detecting whether the memory duplication is correctly performed. When data is directly read to second memory 321 of the non-active processor module 320, the time required to perform may be prohibitively long due to the length and nature of the path from the active processor module 310 to the non-active processor module 320. However, embodiments of the present invention relate to a memory coherency checking mode that performs a coherency checking process after building the image in the first memory 305, before the service switching of the active processor module 310 and retrieving the data of the non-active processor module 320 from the current active processor module 310. Therefore, the image process of the standby memory system for the memory coherency checking is embodied as means for detecting whether the memory duplication is corrently performed. For performing the image process of the standby memory system after directly reading the second memory of the non-active processor module, the required time may be longer because of the length of the path from the active processor module.

PCI-to-PCI bridges 309 and 329 may also function to transmit the data transmitted from the memory duplication engine 307 to the memory system of the non-active processor module. PCI-TO-PCI bridges 309 and 329 may also build duplicated memory contents as the image in the memory system in order to detect if the memory duplication is successively performed and to perform the coherency checking between the image and the original memory contents. PCI-to-PCI bridges 309 and 329 may also provide an interface for memory duplication of the specific region performed in a batch. The memory duplication engine 307 may monitor the memory system of an active processor module and determine whether to duplicate data. The memory duplication engine 307 may transmit corresponding data to the PCI-to-PCI bridge 329 of the non-active processor module when it is necessary to duplicate data, thereby controlling memory duplication.

Figure 5:
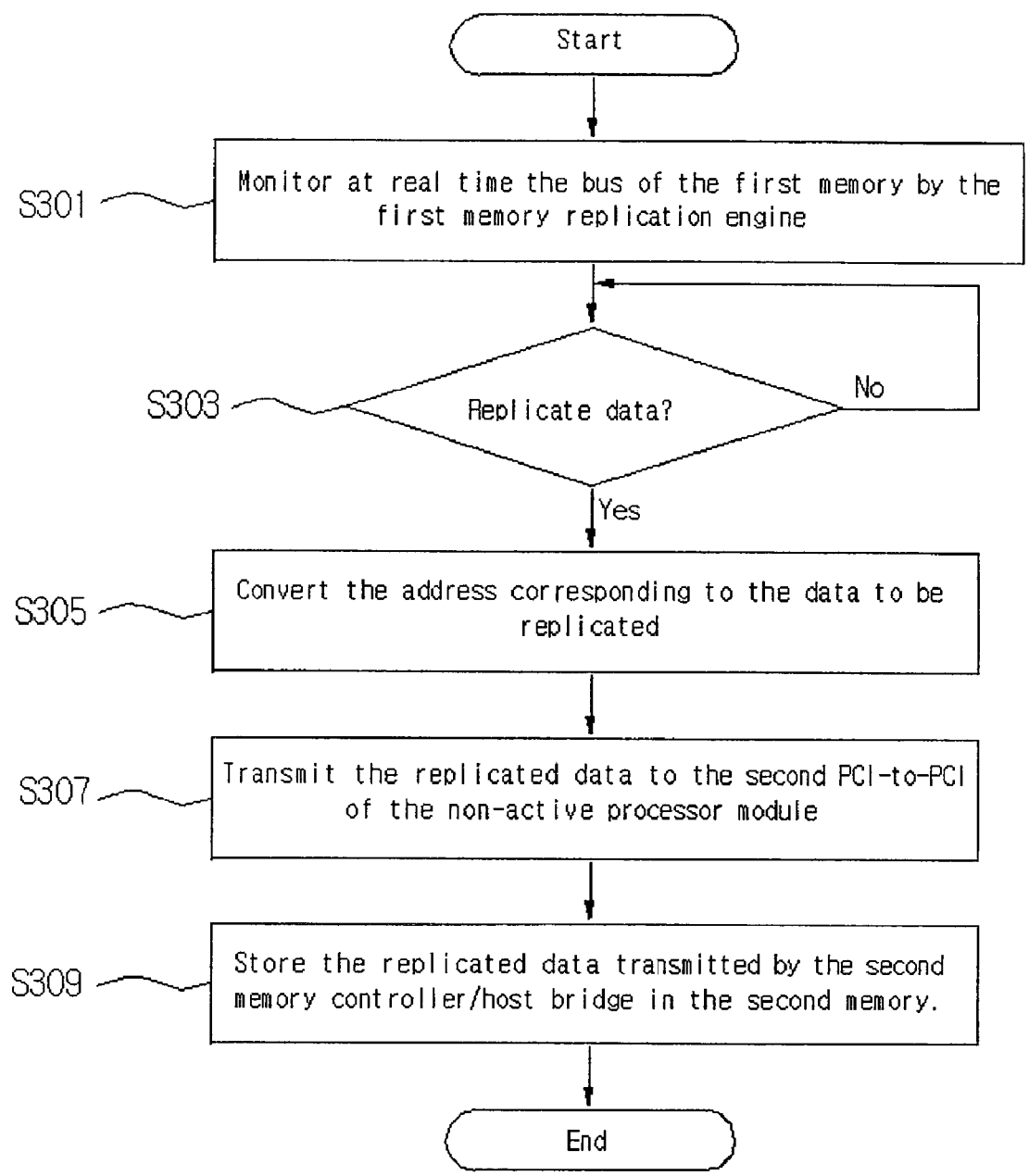
FIG. 5 is an exemplary sequence diagram illustrating a method of duplicating the memory in real-time.

FIG. 5 is an exemplary illustration of a method of duplicating the memory in real time. The memory duplication engine 307 identifies in real time whether there is data currently being recorded by monitoring the memory bus connected to the first memory of the active processor module 310 (S301). It may be determined whether it is required to duplicate the identified data in real time (S303). Conversion of an address corresponding to the data to be duplicated is performed and the duplicated data is temporarily stored in the buffer 341 and transmitted to the second PCI-to-PCI bridge 329 of the non-active processor module (S305). Duplicated data transmitted from the first memory duplication engine may be transmitted to the second memory controller/host bridge 323 through the second PCI-to-PCI bridge 329 (S307). At the second memory controller/host bridge 323, the duplicated data is stored in the second memory 325 (S309).

Figure 6:
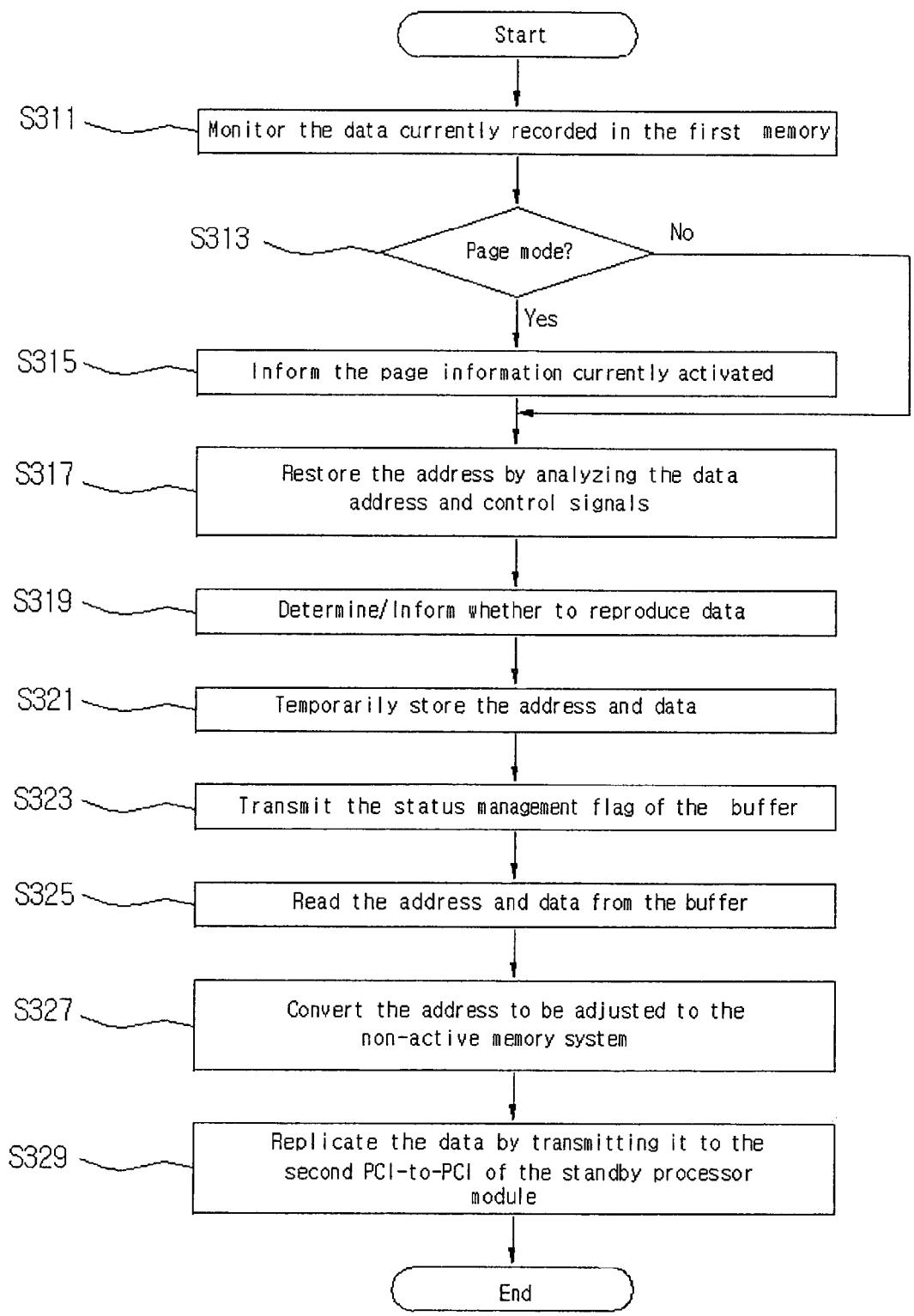
FIG. 6 is an exemplary flow chart illustrating processes of monitoring and duplicating data.

FIG. 6 is an exemplary flow chart illustrating, a process of duplicating the data in real time in the memory duplication engine. Memory bus interface unit 331 of the memory duplication engine 307 monitors the memory bus of the first memory 305 and identifies in real time whether data is being recorded (S311). The page mode controller 335 determines whether the memory system of the active processor module is operating in the page mode (S313). The page mode controller 335 informs the activated page information to the address restoration if it is operating in the page mode (S315). Address restoration 333 receives the address and control signals of the memory bus using the page information. The address restoration 333 analyzes the memory configuration information. The address restoration 333 restores the actual address (S317). The duplication filter 337 determines whether or not the data is to be duplicated from the restored address in reference to a duplication table (S319).

Depending on the result of determination on whether or not the duplication, the buffer manager 339 temporarily stores the restored address and the received data (S321). The status management flag corresponding to the identified current status of the buffer 341 is generated and transmitted to the PCI back end 343 (S323). The PCI back end 343 reads the duplicated data and the address from the buffer by the status management flag (S325). When the duplicated data and the address is transmitted to the PCI master interface unit, the PCI master interface unit performs the address conversion of the data (S327) and transmits the data to PCI-to-PCI bridge 329 through the PCI bus so that the memory duplication can be carried out in real time (S329).

Figure 7:
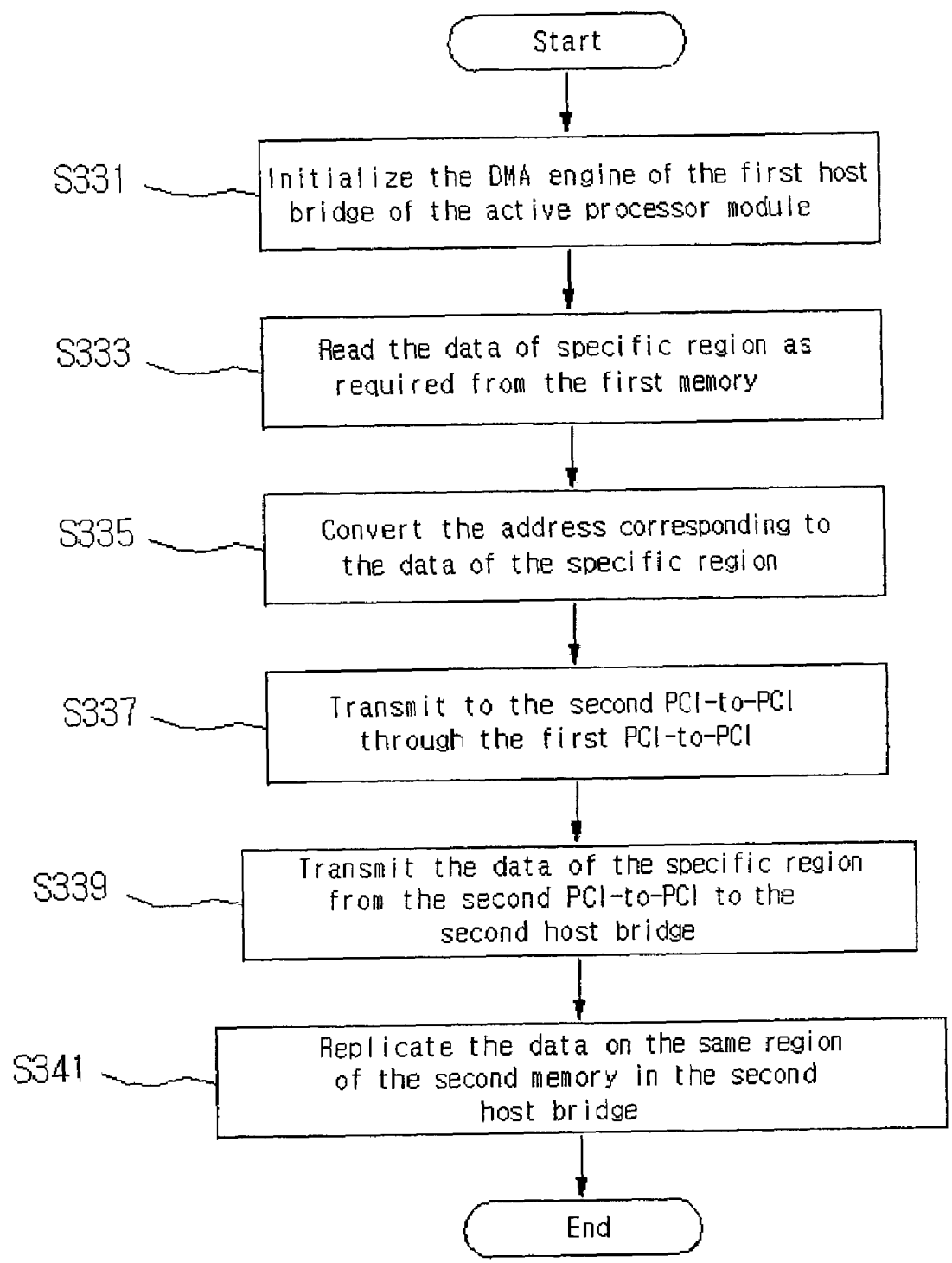
FIGS. 7 and 8 are exemplary sequence diagrams illustrating methods of replicating memory at high-speeds.

FIG. 7 is an exemplary flow chart illustrating a high-speed memory duplication method in accordance with embodiments of the present invention. The first CPU 301 of the active processor module 310 initializes the DMA engine of the first host bridge 303 so that a predetermined region of first memory 305 can be duplicated in second memory 325 (S331). The DMA engine of the first host bridge 303 reads data of the predetermined region from the first memory (S333), converts the address corresponding to the data to the destination address (S335), and transmits this data to the second PCI-to-PCI bridge 329 through the first PCI-to-PCI bridge 307 (S337). Duplicated data of a predetermined region is transmitted to a second memory controller/host bridge through a second PCI-to-PCI bridge and is stored in the corresponding region of a second memory by a second host bridge (S341).

Figure 8:
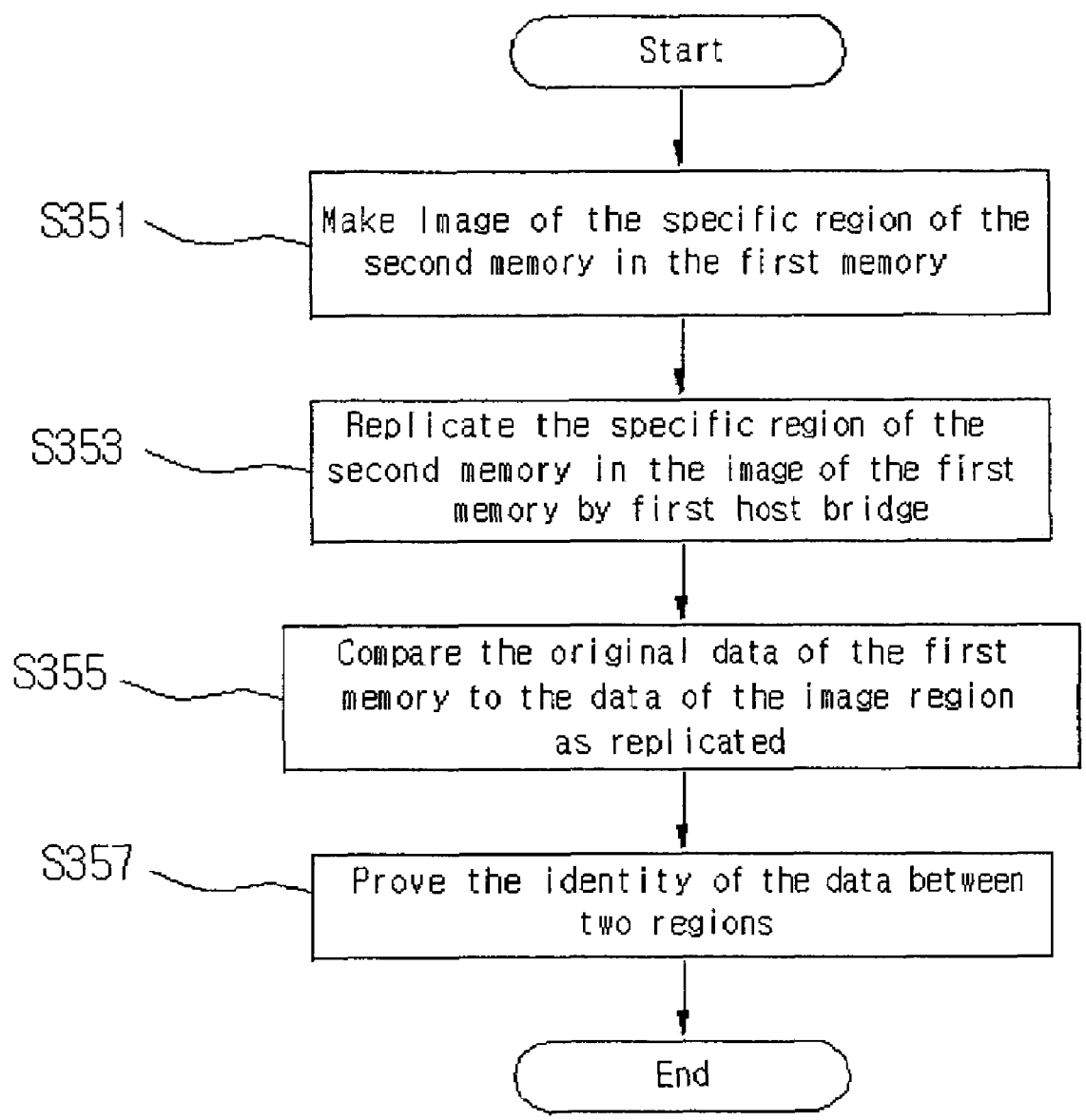

FIG. 8 is an exemplary flow chart illustrating a memory coherency checking method according to embodiments of the present invention. DMA engine of a first bridge may build an image of a region of the second memory in a first memory (S351). DMA engine may request data of a partial region from a second host bridge through first and second PCI-to-PCI bridges. A second host bridge may read requested data of a partial region from a second memory and transmit the data to a first host bridge through a second PCI-to-PCI bridge and a first PCI-to-PCI bridge. A first host bridge may replicate data of a partial region of a second memory on an image of a first image (S353). Data of a second memory being a replicated image region may be compared to original data being stored in a first memory (S355). Coherency of data between two regions may be proved (S357).

Image process of a standby memory system for the memory coherency checking may be possible by building an image of a partial region of a memory system of a non-active processor module in a memory system of an active processor module through a DMA engine of host bridges 25 and 26. An image of a partial region of a standby memory system for memory identity proving may be replicated. Contents of a partial region and those of the same region of the memory system of an active processor module may be compared; thereby performing memory coherency checking and determining whether a memory duplication operation was correctly performed. A memory coherency checking process may be performed shortly before an active processor module is operationally switched to a non-active processor module. Memory coherency checking process can be similar to a high-speed memory duplication process, except that a memory duplication operation may be generated from a non-active processor module to an active processor module.

In a scalable multi-processing structure using a PCI bus according to embodiments of the present invention, any additional bus for the memory duplication is not embodied but the memory duplication system is embodied sharing the existing PCI bus for the communication between the processors, thereby improving the Mean Time Between Failures (MTBF) in a multi-processing system using a PCI bus. Further, as construction of the hardware is simplified by embodiments, resulting in lower costs. Embodiments of the present invention provide real time memory duplication and an image process of a standby memory system for high speed memory duplication and memory identity proving, thereby having improved capability and a desirable MTBF.

In embodiments, a multi-processing system using a PCI bus may include the following. An active processor module having a first central processing unit (CPU) for performing various control and data processing, and a first memory controller/host bridge for controlling read/write to a first memory and for duplicating the memory data by a predetermined region. A non-active processor module having a second central processing unit (CPU) for performing various control and data process, and a second memory controller/host bridge for controlling read/write to a second memory and for storing the duplicated memory data of the region. First and second PCI-to-PCI bridges for interfacing a number of the active and non-active processor modules one another, and transmitting the duplicated memory data of the region to the host bridge of the non-active processor module by the host bridge of the active processor module.

In embodiments, the active processor module further comprising a memory duplication engine being connected to a memory bus between the memory controller/host bridge and the memory; replicating the real time data as currently recorded; and transmitting the data to the PCI-to-PCI bridge of the other module. In embodiments, the memory duplication engine performs the duplication operation of the data at real time during the active processor module is activated. In embodiments, the first and second memory controllers/host bridges are connected to the PCI-to-PCI bridge through the PCI bus, and read/write the data of the predetermined region in the memory on its own side. In embodiments, the first and second host bridges include a direct memory access (DMA) engine to directly read/write the required data of the determined region in the memory on its own side. In embodiments, the DMA engine of the host bridge reads the data from the memory of its own side, converts the address, and transmits the data to the PCI-to-PCI bridge of the other processor module. In embodiments, the DMA engine of the host bridges reads the determined region of the data of the second memory of the non-active processor module, builds and replicates an image of the data on the first memory of the active processor module, and then performs whether or not the identity of the data by the region.

Embodiments of the present invention relate to a multi-processing system using a PCI bus including the following. First and second processor modules, being dually operated, having first and second central processing units (CPU) for performing various control and data process, first and second memory controllers/host bridges for controlling memory and for directly accessing to data, and first and second memories. First and second memory duplication engines for duplicating data to be duplicated and transmitting the duplicated data to the other processor module after monitoring, at real time, the data stored in the memory of the activated processor module. First and second PCI-to-PCI bridges for performing the communication between the first and second processor modules and for transmitting the data duplicated from the other memory duplication engine to one memory controller/host bridge. In embodiments, the first and second host bridges include the DMA engine to directly access to one memory and accessing the data of the predetermined region unit. In embodiments, the memory duplication engine and the PCI-to-PCI bridge are connected to a PCI master interface unit. In embodiments, the memory controller/host bridge and the PCI-to-PCI bridge are connected to each other by a PCI bus and by interfacing a number of processor modules one another. In embodiments, the first host bridge performs a high speed duplication of the data of the region in the first memory using the DMA engine, and then transmits the data to the second PCI-to-PCI bridge of the non-active processor module through the first PCI-to-PCI bridge. In embodiments, the first host bridge is required the data of the predetermined region from the DMA engine of the second host bridge using the DMA engine and by building an image of the data of the partial region in the other memory and performing an identity proving.

In embodiments, the memory duplication engine includes the following. A memory bus interface unit for monitoring a first memory through a memory bus. A page mode controller for managing page information regarding the memory of the active processor module operating as a page mode. An address restoration unit for restoring an actual address by analyzing the data address and control signals received through the memory bus interface unit using the page information. A duplication filtering unit for determining whether or not the data duplication unit from the restored address in reference with a duplication table. A buffer for temporarily storing the date to be duplicated. A buffer manager for storing the address restored at the address restoration unit and the data received through the memory bus interface unit according to the determination on whether or not the data duplication at the duplication filter, and for managing current status of the buffer. A PCI back end unit for reading the data and address from the buffer by identifying the status of the buffer. A PCI master interface unit for transmitting the data as read at the PCI back end to the other PCI-to-PCI bridge through the PCI bus. Embodiments of the present invention relate to a method of duplicating memory of the multi-processing system using a PCI bus, including the following steps. Monitoring the memory, in which a memory duplication engine monitors a memory bus interfaced with the memory of the active processor module, and whether or not the currently recorded data exist is identified at real time. Duplicating the data, by performing a conversion of the address corresponding to the data to be duplicated and transmitting the duplicated data to the second PCI-to-PCI bridge of a non-active processor module, after identifying whether or not the duplication of data as a result of checking the real time. Transmitting the duplicated data, in which the second PCI-to-PCI bridge transmits the duplicated data transmitted from the memory duplication engine to the second memory controller/host bridge. Recording the duplicated data, in which the data duplicated by the second memory controller/host bridge is recorded in the second memory.

In embodiments, the steps of monitoring and duplicating the data comprise the following steps. Identifying, at real time, whether or not there are currently recorded data by monitoring the memory bus interfaced to the first memory of the active processor module. Informing information of an activated page when the first memory operates as a page mode. Restoring an address of the memory bus by using the page information and an actual address by analyzing the memory configuration information. Determining whether or no the data are duplicated from the restored address, in reference to the duplicated table. Temporarily storing the restored address and the received data in a buffer according to the result of determining on whether or not the duplication. Generating a status management flag which corresponds to an identified status by identifying a current status of the buffer. Reading the duplicated data and address from the buffer by the status management flag and performing an address conversion. Performing the memory duplication at real time by transmitting the data to the other PCI-to-PCI bridge through the PCI bus.

Embodiments of the present invention relate to a method of duplicating memory of the multi-processing system using the PCI bus, the method comprising the following steps. Initializing a direct memory access (DMA) engine of a first host bridge so that a first CPU performs to duplicate the data at the predetermined region of a first memory at a second memory. Converting a corresponding by reading the data of the predetermined region as required from the first memory by the DMA engine, and transmitting to the first and second PCI-to-PCI. Transmitting duplicated data at the predetermined region to the second memory controller/host bridge by the second PCI-to-PCI. Recording the duplicated data at the predetermined region at the second memory by the second memory controller/host bridge.

Embodiments of the present invention relate to A method of duplicating memory of the multi-processing system using the PCI bus, the method comprising the following steps. Producing an image at a part of region in the first memory by the first host bridge of the active processor module. Reading data at any specified region recorded in the second memory of the non-active processor module through the firs and second PCI-to-PCI bridges. Replicating the data of the specified region in the second memory as an image at the first memory. Determining whether or not the memory duplication is normal by proving an identity of the contents stored in the replicated specific region and the contents stored in the first memory. In embodiments, the identity proving between the data stored in the memory is performed before the active processor module is switched to the non-active processor module.

Embodiments of the present invention relate to a memory processing device using a PCI bus, the device may include at least one of the following. Means for controlling various controls and data processes. A memory for storing the data. A memory controller/host bridge for controlling read/write operation in the memory, and for duplicating the memory data by a predetermined region. A PCI-to-PCI bridge for transmitting the duplicated memory data by the region to the other processor module by the memory controller/host bridge. In embodiments, the memory processing device further comprising a memory duplication engine being connected to a memory bus between the memory controller/host bridge and the memory, and replicates the real time data as currently recorded, and transmits the duplicated data to the PCI-to-PCI bridge of the other module.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus comprising:
   a first processor module;
   a second processor module;
   a bus coupled to the first processor module and the second processor module,
   wherein the bus is configured to transmit both processor related communication and memory related communication and wherein:
      the first processor module comprises a first processing unit, a first memory controller/host bridge, a first PCI-to-PCI bridge, a first memory replication engine and a first memory unit; and
      the second processor module comprises a second processing unit, a second memory controller/host bridge, a second PCI-to-PCI bridge, a second memory replication engine and a second memory unit,
      wherein the first PCI-to-PCI bridge, the second PCI-to-PCI bridge, the first memory replication engine, and the second memory replication engine are mutually coupled by the bus,
      the first memory controller/host bridge coupled to the first memory replication engine and the first memory unit,
      the second memory controller/host bridge coupled to the second memory replication engine and the second memory unit,
      the first memory controller/host bridge coupled to the first PCI-to-PCI bridge,
      the second memory controller/host bridge coupled to the second PCI-to-PCI bridge,
      the first memory controller/host bridge coupled to the first processing unit, and
      the second memory controller/host bridge coupled to the second processing unit.

2. A multi-processing system comprising:
   an active processor module having a first processing unit, a first memory, a first memory controller/host bridge to control read/write to the first memory and a first memory dupication engine to duplicate a predetermined region of the first memory;
   a non-active processor module having a second processing unit, a second memory, a second memory controller/host bridge to control read/write to the second memory and a second memory dupication engine to store the duplicated data; and
   a first PCI-to-PCI bridge and a second PCI-to-PCI bridge coupled by a first bus to interface the active processor module and the non-active processor module, and to transmit the duplicated data of the predetermined region to the non-active processor module, the first PCI-to-PCI bridge, the second PCI-to-PCI bridge, the first memory duplication engine and the second memory duplication engine each being coupled to the first bus.

3. The system of claim 2, wherein the first memory duplication engine is coupled to a second bus between the first memory controller/host bridge and the first memory, and the first memory duplication engine to replicate real time data and to transmit the data to the second PCI-to-PCI bridge of the non-active processor module.

4. The system of claim 3, wherein the first memory duplication engine performs the duplication of the data in real time when the active processor module is activated.

5. The system of claim 2, wherein the first memory controller/host bridge is coupled to the first PCI-to-PCI bridge by a PCI bus to read/write the data from the first memory.

6. The system of claim 2, wherein the first memory controller/host bridge includes a direct memory access (DMA) engine to directly read/write the data of the predetermined region from the first memory.

7. The system of claim 6, wherein the DMA engine reads the data from the first memory, converts an address, and transmits the data across the first bus to the second PCI-to-PCI bridge of the non-active processor module.

8. The system of claim 2, wherein the second memory controller/host bridge includes a direct memory access (DMA) engine to read data from a predetermined region of the second memory of the non-active processor module, and to replicate an image of the read data onto the first memory of the active processor module.

9. A multi-processing system comprising:
   first and second processor modules having first and second processing units for performing control and data processes, first and second memory controller/host bridges to control memory and to directly access data, and first and second memories;
   first and second memory duplication engines to duplicate data and to transmit the duplicated data to the other processor module after monitoring, in real time, the data being stored in the first memory of the first processor module; and
   a first PCI-to-PCI bridge and a second PCI-to-PCI bridge to allow communication between the first and second processor modules and to transmit the data duplicated by the first memory duplication engine to the second memory controller/host bridge of the second processor module, the first PCI-to-PCI bridge, the second PCI-to-PCI bridge, the first memory duplication engine and the second memory duplication engine each being coupled to a first PCI bus.

10. The system of claim 9, wherein each of the first and second memory controller/host bridges includes a direct memory access (DMA) engine to directly access a memory and to access data of a specific region of the memory.

11. The system of claim 10, wherein the first memory controller/host bridge of the first processor module performs high speed duplication of the data of the specific region in the first memory using the DMA engine, and the first memory controller/host bridge to transmit the data to the second PCI-to-PCI bridge of the second processor module through the first PCI-to-PCI bridge.

12. The system of claim 10, wherein the first memory controller/host bridge of the first processor module acquires the data of the specific region from the DMA engine of the second memory controller/host bridge by receiving an image of data of a partial region in the second memory and performing an identity proving.

13. The system of claim 9, wherein the first memory duplication engine and the first PCI-to-PCI bridge of the first processor module are coupled to a PCI master interface unit.

14. The system of claim 9, wherein the first memory controller/host bridge is coupled to the first PCI-to-PCI bridge by a second PCI bus.

15. The system of claim 9, wherein the first memory duplication engine of the first processor module comprises:
   a memory bus interface unit to monitor the first memory through a memory bus;
   a page mode controller to manage page information regarding the first memory;
   an address restoration unit to restore an actual address based on data address and control signals received through the memory bus interface unit;
   a duplication filtering unit to determine whether data is duplicated based on the restored address;
   a buffer to store the data to be duplicated;
   a buffer manager to store the restored address and the data received through the memory bus interface unit and to manage a current status of the buffer;
   a PCI back end unit to read the data and address from the buffer; and
   a PCI master interface unit to transmit the data as read at the PCI back end to the second PCI-to-PCI bridge.

* * * * *